United States Patent
Quach et al.

(10) Patent No.: US 7,383,468 B2
(45) Date of Patent: Jun. 3, 2008

(54) APPARATUS AND METHOD FOR PROTECTING CRITICAL RESOURCES AGAINST SOFT ERRORS IN HIGH PERFORMANCE MICROPROCESSOR

(75) Inventors: Nhon T. Quach, Santa Clara, CA (US); John H. Crawford, Sunnyvale, CA (US); Chakravarthy Kosaraju, Sunnyvale, CA (US); Venkatesh Nagapudi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/634,899

(22) Filed: Aug. 6, 2003

(65) Prior Publication Data

US 2004/0030959 A1 Feb. 12, 2004

Related U.S. Application Data

(63) Continuation of application No. 09/608,959, filed on Jun. 30, 2000, now Pat. No. 6,654,909.

(51) Int. Cl.
G06F 11/00 (2006.01)
(52) U.S. Cl. .............................. 714/30
(58) Field of Classification Search ............. 714/30, 714/31, 27, 25, 37, 48, 49, 57
See application file for complete search history.

(56) References Cited

U.S. PATENT DOCUMENTS 3,814,919 A * 6/1974 Repton et al. ............. 714/25
4,641,305 A * 2/1987 Joyce et al. ............... 714/17
5,157,780 A * 10/1992 Stewart et al. ............ 714/31
5,274,646 A * 12/1993 Brey et al. ................ 714/758
5,333,274 A * 7/1994 Amini et al. .............. 714/50
5,361,267 A * 11/1994 Godiwala et al. ......... 714/755
5,515,506 A * 5/1996 Dixon ....................... 714/42
5,629,950 A * 5/1997 Godiwala et al. ......... 714/805
6,009,548 A * 12/1999 Chen et al. ............... 714/762
6,226,763 B1 * 5/2001 Fu et al. ................... 714/53
6,279,139 B1 * 8/2001 Miyasita ................... 714/801
6,654,905 B1 * 11/2003 Dickens ................... 714/10
6,654,909 B1 * 11/2003 Quach et al. ............. 714/30

* cited by examiner

Primary Examiner—Nadeem Iqbal
(74) Attorney, Agent, or Firm—Kenyon & Kenyon LLP

(57) ABSTRACT

The invention relates to the design of highly reliable microprocessors and more specifically to the use of a dedicated state machine that periodically checks the validity of critical processor resources. In an embodiment of the present invention, an apparatus to detect errors in information stored in a processor resource includes an error detection component, which is configured to control the detection of errors in the information stored in the processor resource; and a comparison component coupled to the error detection component, which is configured to receive the information from the processor resource and inputs from the detection component. The comparison component is further configured to determine if the information is valid, and to output a signal to replace the information if the information if invalid.

19 Claims, 3 Drawing Sheets

APPARATUS AND METHOD FOR PROTECTING CRITICAL RESOURCES AGAINST SOFT ERRORS IN HIGH PERFORMANCE MICROPROCESSOR

CROSS REFERENCE TO RELATED APPLICATIONS

This application is a continuation of application Ser. No. 09/608,959 filed Jun. 30, 2000 now U.S. Pat. No. 6,654,909, the contents of which is incorporated herein in its entirety by reference thereto.

FIELD OF THE INVENTION

The invention relates to the design of highly reliable microprocessors and more specifically to the use of a dedicated state machine that periodically checks the validity of information stored in critical processor resources.

BACKGROUND

To protect against soft errors, which may cause faulty system operations, modern microprocessors often use parity or Error Correcting Code (ECC) check bits to protect large memory structure such as caches, memory queues, and buffers. While parity and ECC check bits are effective means for combating soft errors, both are expensive in terms of the silicon area for implementation, timing impact, and power consumption. Another drawback to the use of parity or ECC check bits is that the consumed data must be explicitly read out from the memory structures before the parity of the data can be computed. However, not all critical resources in high performance microprocessors that must be protected have this property. In certain critical processor resources, the data can be consumed without being read out explicitly. For example, in a model specific register (MSR) that contains configuration data, the data are often consumed without explicitly being read out.

As another example, Intel® Architecture 64-bit. (IA-64) processors often use a technique called pre-validated Region Identification (RID) and pre-validated protection key to speed up the address translation process. IA-64 processors are manufactured by Intel Corporation of Santa Clara, Calif. In the prevalidation scheme, (1) the register index of the RID or protection key to be updated is used to disable all entries with a matching register index in the translation lookaside buffer (TLB), and (2) the new content of the region ID or protection key is then used to enable any matching entry in the TLB.

Only the enabled entries participate during the address translation process. The disabled entries are not removed and can be later re-enabled. Effectively, pre-validation removes the need to compare the RID and protection key during the address translation process. In this way, the address translation processor may be sped up. A side-effect of prevalidation is to turn a frequently used critical resource into an infrequently used critical resource. If any soft error happens to the RID and/or the protection key in the TLB, the processor will operate incorrectly because the RID and/or the protection key may be corrupted.

Therefore what is needed is an efficient apparatus and/or method to protect these infrequently used critical processor resources, such as, for example, the MSR and the pre-validated RIDs and protection keys in the TLB.

DETAILED DESCRIPTION OF THE INVENTION

In accordance with an embodiment of the present invention, a dedicated hardware error detection apparatus is used to periodically read out the critical resources and compute their parity or ECC bits. The parity and ECC bits may be shared within the same or across the critical resources. In the TLB pre-validated RIDs or protection keys case, because the RIDs and/or the data are updated relatively infrequently, this scheme provides good protection against soft errors. Similarly, applying this technique to MSRs that are accessed infrequently yields the similar good protection benefit. The advantage of this technique is low cost and no impact on the timing critical paths, allowing a higher operating processor frequency. In the conventional parity scheme, protecting 100 32-bit registers will require 100 parity bits (1 per register) and 100 sets of logic to generate and check the parity. In accordance with an embodiment of the present invention, in the proposed scheme only 1 parity bit and 1 set of logic are needed to generate and check the parity bit since the parity bit and the logic are shared among all the registers. In addition, the parity generation and check logic is much simpler since it is computed in a serial fashion. Another advantage is that other, arbitrarily complicated protection schemes, such as, for example, checksum and double correct/triple detect may be implemented to provide a more robust error protection (against multiple bit errors and block errors).

In accordance with an embodiment of the present invention, methods to protect the critical resources used in microprocessors are described herein. As a way of illustration, two hardware-based implementations in which an error detection state machine (EDSM), in accordance with an embodiment of the present invention, is shown and described protecting a Translation Lookaside Buffer (TLB) and protecting a Control Register Access Bus (CRAB). However, while the illustrated embodiments are described in relation to a TLB and a CRAB as, generally, implemented in IA-64 processors, these implementations should not be taken to limit any alternative embodiments directed to additional processor resources or alternative processor architectures, which fall within the spirit and the broad scope of the appended claims.

Figure 1:
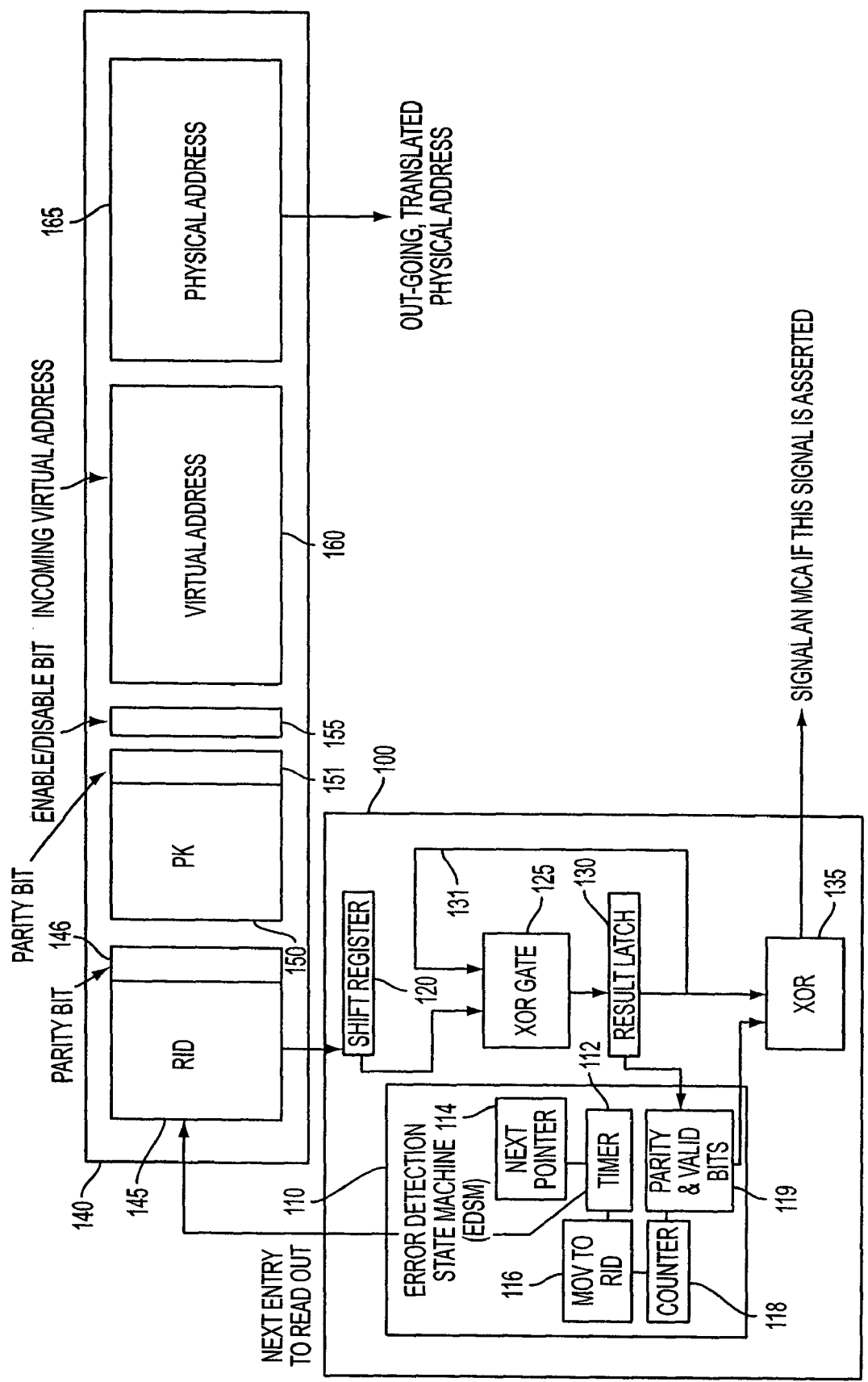
FIG. 1 is a high level logic block diagram illustrating an error detection apparatus being used to protect pre-validated region identifications (RIDs) in the translation look-aside buffer (TLB), in accordance with an embodiment of the present invention.

FIG. 1 is a high-level logic block diagram illustrating an error detection apparatus being used to protect pre-validated region identifications (RIDs) in the translation look-aside buffer (TLB), in accordance with an embodiment of the present invention. In FIG. 1, in accordance with an embodiment of the present invention, a simple 1-bit parity scheme is used by an error detection apparatus 100 to protect a pre-validated RID array 145 in a TLB 140. The error detection apparatus 100 includes an error detection state machine (EDSM) 110, a shift register 120, an XOR gate 125 coupled to the shift register 120 and a feedback channel 131, a result latch 130 coupled to the XOR gate 125 and the EDSM 110, and an XOR gate 135 coupled to the result latch 130 and the EDSM 110. The TLB 140 includes the RID array 145, a RID parity bit array 146, a protection key register array 150, a protection key register parity bit array 151, an enable/disable bit 155, a virtual address 160 and a physical address 165. In accordance with an embodiment of the present invention, the EDSM 110 periodically reads out the content of an entry (a row) in the RID array 145, which includes the parity bit for the row, stores the read-out content in the shift register 120 and computes the parity bit for the read-out entry in a serial fashion by the XOR gate 125. In, general, at the end of the parity computation step as indicated by counter 118 the computed parity bit in the result latch 130 will be stored in the parity and valid bits register 119 if the valid bit is not set. If the valid bit in the parity and valid bits register 119 is set, the parity of the result latch 130 will be compared with the parity bit in the parity and valid bits register 119. A mismatch results in a Machine Check Abort (MCA) signal being out. This MCA will cause the processor to transfer execution control to the firmware error handler to take proper error recovery action. The EDSM 110 uses the existing read port into the region ID or protection key arrays. When computing the parity bit, the content of the RID array 145 is read into the shift register 120. The content of the shift register 120 is then shifted out 1 bit at a time and the output of the shift register 120 is fed into the XOR gate 125. At the end of the shift operation as indicated by the EDSM 110, the polarity of the result latch 130, which indicates whether the entry will have a parity error, is output to the XOR gate 135 and fed back to the XOR gate 125. The end-of-shift signal that is output from the EDSM 110 is also received by the XOR gate 135.

In FIG. 1, in accordance with an embodiment of the present invention, the EDSM 110 includes a timer 112 a next pointer 114 and a move to RID indicator 116. The timer 112 is fired periodically to initiate a read of a row from the RID array 145 into the shift register 120. The counter 118 counts the number of shifts needed to compute the proper parity bit. If the valid bit is not set, then the parity and valid bits register 119 stores the result of the parity bit computation; otherwise, the parity and valid bits register 119 stores the parity bit used to compare with the parity bit in the result latch 130. The EDSM 110 also remembers which entry to read out via the next pointer 114 logic, which stores a pointer that is used to determine which row in the RID array 145 is to be read-out, for example, the pointer can be used to indicate the actual row to be read-out or the last row that was read out. The move to RID 116 logic monitors any incoming move to RID operation and will also invalidate the valid bit of the parity and valid bits register 119. The EDSM 110 will not do a read if there is an incoming RID operation. Note that, in other embodiments of the present invention, the XOR gate 125 can be replaced by other logic to implement other arbitrary and more complicated protection schemes, such as, for example, checksumming the entire contents of the RID array 145. In such embodiments, for example, a pre-validated checksum value can be associated with the RID array 145, either in place of or in conjunction with the parity bit array 146, the entire contents of the RID array 145 can be read out, and a new checksum value can be computed by the checksum logic.

In accordance with an embodiment of the present invention, the EDSM periodically reads out the contents of the entire RID array, which includes at least one parity bit, stores the read-out content in the shift register 120 and computes the parity bit for the read-out contents in the serial fashion described above for a single RID entry.

In accordance with an embodiment of the present invention, the error detection apparatus 100 is coupled to the protection key register array 150 and operates to protect the protection key register array 150 in a manner similar to that described above for the RID 145.

In accordance with an embodiment of the present invention, a separate error detection apparatus 100 can be coupled to each of the RID 145 and the protection key register array 150 and each error detection apparatus 110 operates as described above in the discussion of FIG. 1.

The MSRs in a processor, generally, contain critical data used by the processor. For this reason, the MSR bits must be protected adequately to reduce the chance of silent data corruption.

As a result, there is a need to protect certain MSRs and, if the number of MSRs to be protected is small, then a conventional ECC scheme may be sufficient. However, if the number of the MSRs is large, protecting the MSR bits using full ECC or parity quickly becomes expensive.

Figure 2:
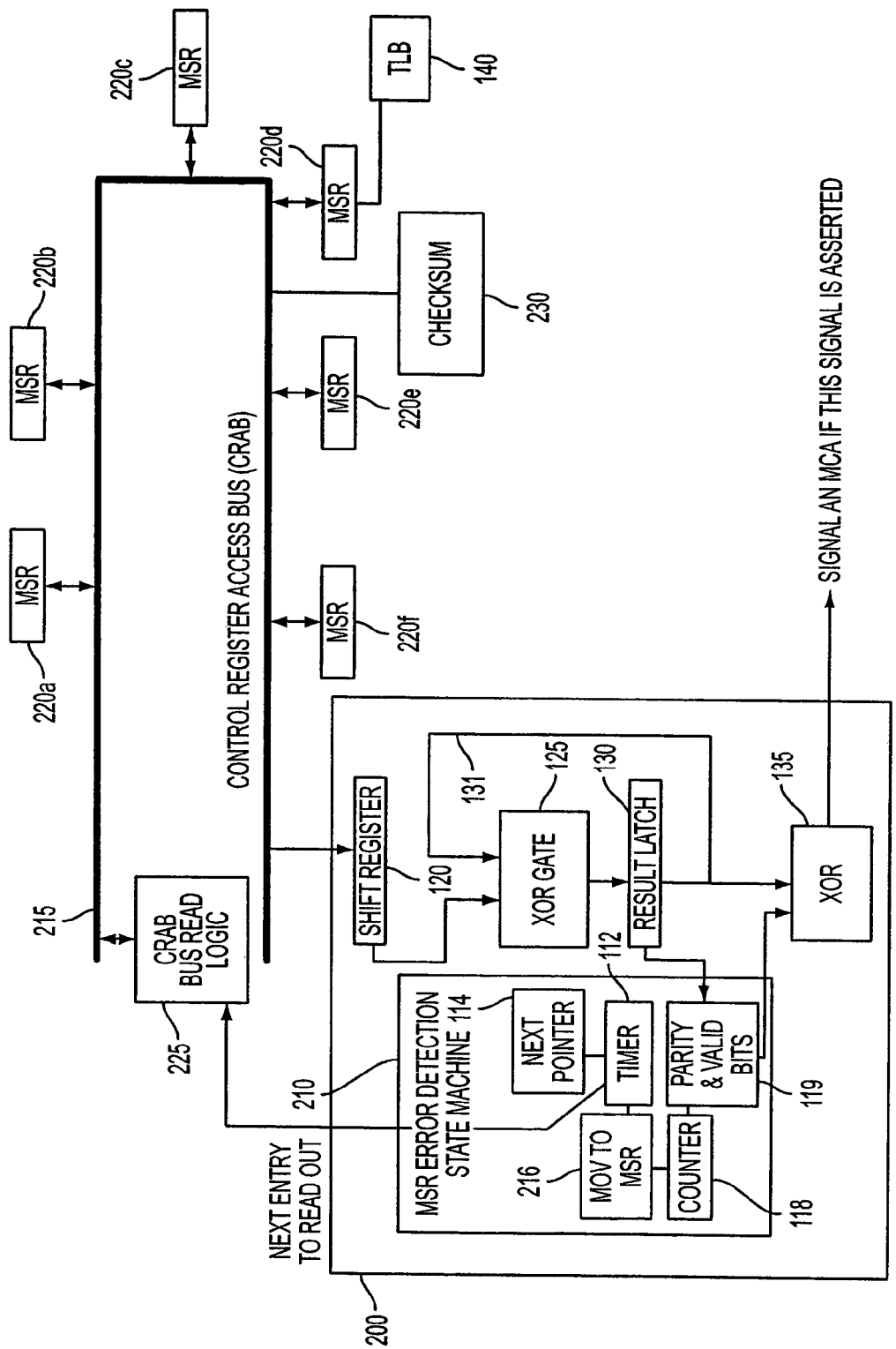
FIG. 2 is a logic block diagram illustrating an error detection apparatus being used to protect model specific registers (MSRs), in accordance with an embodiment of the present invention.

FIG. 2 is a logic block diagram illustrating an error detection apparatus being used to protect MSRs, in accordance with an embodiment of the present invention. In FIG. 2, in accordance with an embodiment of the present invention, a simple 1-bit parity scheme is used, such as, for example, the scheme used by and described above for the error detection apparatus 100 of FIG. 1. In FIG. 2, an MSR error detection apparatus 200 uses the 1-bit parity scheme to protect the MSRs 220a-220f on the Control Register Access Bus (CRAB) 215. The MSR error detection apparatus 200 is similar to the error detection apparatus 100 of FIG. 1 and includes an MSR error detection state machine (MSR EDSM) 210, the shift register 120, the XOR gate 125 coupled to the shift register 120 and the feedback channel 131, a result latch 130 coupled to the XOR gate 125 and the MSR EDSM 210, and an XOR gate 135 coupled to the result latch 130 and the MSR EDSM 210.

In FIG. 2, in accordance with an embodiment of the present invention, the CRAB 215 is coupled to a CRAB bus read logic 225, which controls access to and from the CRAB. In accordance with an embodiment of the present invention, the MSR EDSM 210 periodically reads out the content of one of the MSRs with a parity bit or checksum and computes a new parity bit or checksum for the read-out entry. The computed parity bit or checksum is compared with the read-in parity bit or checksum and any mismatch results in an MCA signal being output. The MCA causes the processor error recovery firmware to be activated and to take the necessary error correction action.

In FIG. 2, the MSR EDSM 210 uses an existing read port into the CRAB bus read logic 225 to request the next entry to be read out. When computing the parity bit, the content of an MSR is read into the shift register 120. The content of the shift register 120 is then shifted out 1 bit at a time and the output of the shift register 120 is fed into the XOR gate 125. Specifically, on the final shift, as indicated by the counter 118 the parity bit in the result latch 130 will be stored into the parity and valid bits register 119 if the valid bit is not set. If the valid bit is set, the computed parity bit will be compared with that in the parity and valid bits register 119. At the end of the shift operation as indicated by the MSR EDSM 210, the polarity of the result latch 130, which indicates whether the entry will have a parity error, is output to the XOR gate 135 and fed back to the XOR gate 125. The end-of-shift signal that is output from the MSR EDSM 210 is also received by the XOR gate 135.

In FIG. 2, in accordance with an embodiment of the present invention, the MSR EDSM 210 includes a timer 112, a next pointer 114 and a move to MSR indicator 216. The MSR EDSM 210, in FIG. 2, operates in the same manner as the EDSM 110 of FIG. 1. The timer 112 is fired periodically to initiate a read of an MSR 220a-220f into the shift register 120 to check if the read-out MSR is still valid. The MSR EDSM 210 also remembers which entry to read out via the next pointer logic 114, which stores a pointer that is used to determine which of the MSRs 220a-220f is to be read-out, for example, the pointer can indicate the actual row to be read-out or the last row that was read out. The move to MSR 216 logic monitors any incoming move to MSR operation. The MSR EDSM 210 will not do a read if there is an incoming MSR operation. Note that the XOR gate 125 can be replaced by other logic to implement other arbitrary and more complicated protection schemes such as, for example, checksumming the entire content of the MSR array, which may be stored in a separate checksum component 230.

Figure 3:
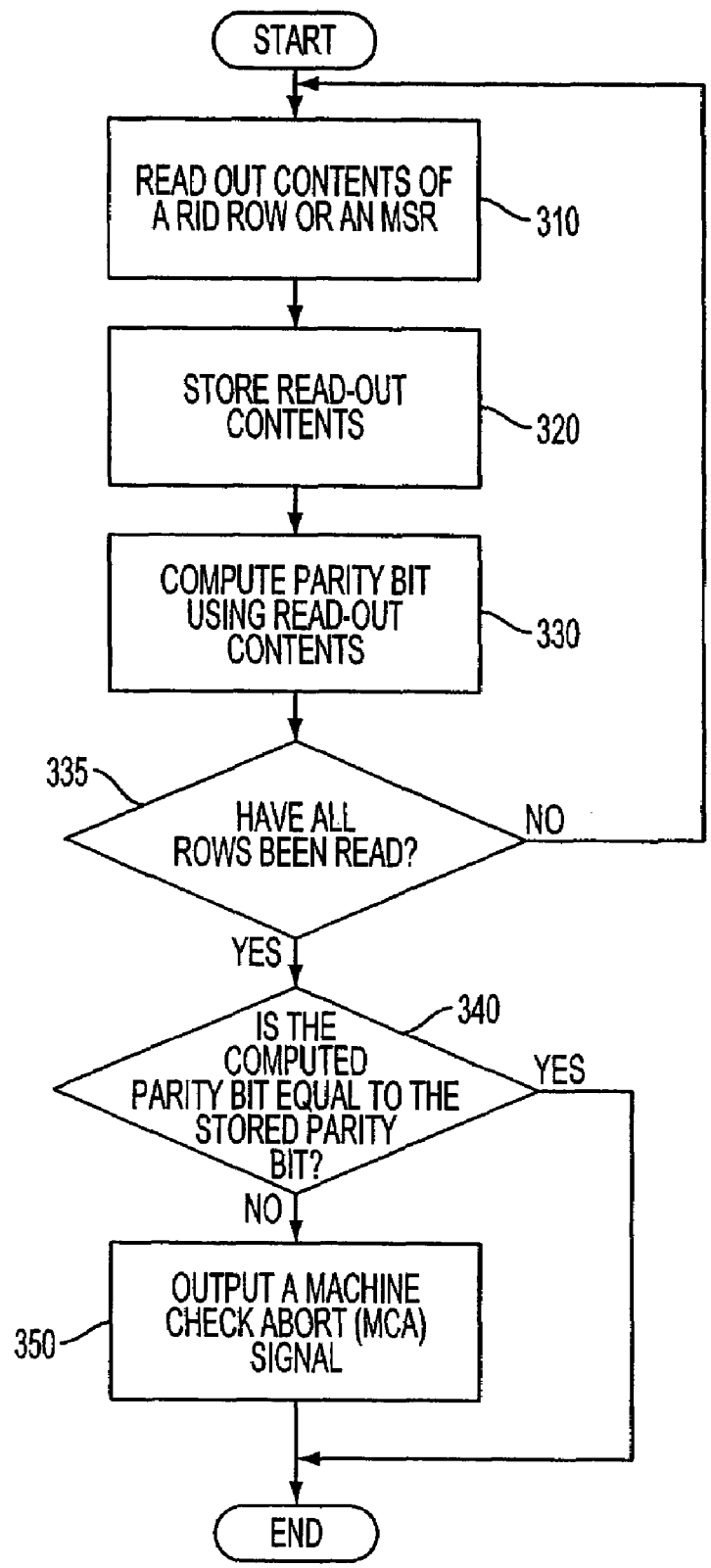
FIG. 3 is a detailed functional flow diagram of the operation for the error detection apparatus' detailed in FIGS. 1 and 2, in accordance with an embodiment of the present invention.

FIG. 3 is a detailed functional flow diagram of the operation for the error detection apparatus' detailed in FIGS. 1 and 2, in accordance with an embodiment of the present invention. In FIG. 3, in block 310, depending on what the EDSM is protecting, the contents of a row in the RID 145 and the associated parity bit from parity bit column 146 or one of the MSRs are periodically read out and, then, in block 320, the contents are stored in the shift register 120. In block 330, a parity bit or checksum for the contents stored in the shift register is calculated. This calculation is accomplished by shifting out the contents of the shift register 120 1 bit at a time and feeding each shifted-out bit into the XOR gate 125 along with a bit signal on feedback line 131. In block 340, if the valid bit is not set, then the parity and valid bits register 119 stores the result of the parity bit computation; otherwise, the parity and valid bits register 119 stores the parity bit that is to be used to compare with the computed parity bit in the result latch 130. If the valid bit is set, then, the computed parity bit is compared to the stored parity bit in the parity and valid bits register 119, to determine if they are equal, which would indicate that the contents in the RID 145 or MSR are valid. The XOR gate 125 outputs a polarity as a result of this comparison of bits and sends the polarity to the result latch. If the stored and computed parity bit or checksum in the XOR gate 125 then the polarity goes and the associated parity bit low and, if the stored and output values do not match, then the polarity goes high. In block 350, if the stored and output values do not match, then a machine check abort (MCA) signal is output. The MCA causes the processor error recovery firmware to be activated and to take the necessary error correction action. Outputting the MCA is performed by the XOR gate 135 when the polarity of only one of either the stored parity bit received from the parity and valid bits register 119 and the final output from the result latch are high.

In accordance with an embodiment of the present invention, when the processor is reset, the contents of some of the MSRs 220a-220f may not be valid and the processor firmware is responsible for initializing the MSRs 220a-220f. Generally, after the MSRs are initialized, the processor firmware computes the effective parity and then writes it into the parity and valid bits register 119 inside the MSR EDSM 210 and then starts the MSR EDSM 210. The MSR EDSM 210 will only compare the computed parity bit (or checksum) when the valid bit is set. The values in the MSRs 220a-220f may also be changed. In this case, PAL disables the MSRs 220a-220f and then updates the MSR. The parity bit or checksum is then re-computed and updated in the MSR EDSM 210.

In another embodiment of the present invention, the error detection apparatus 200 is coupled to the CRAB 215, which is coupled to at least one other CRAB and operates to protect the protection key register array 150 in a manner similar to that described above for the RID 145.

In another embodiment of the present invention, multiple error detection apparatus 200 are coupled to the CRAB 215 and operate to protect the CRAB 215 in a manner similar to that described above for the single error detection apparatus 200 coupled to the CRAB 215.

In another embodiment of the present invention, multiple error detection apparatus 200 are coupled to the CRAB 215, which is coupled to at least one other CRAB and operates to protect the protection key register array 150 in a manner similar to that described above for the RID 145.

In accordance with an embodiment the present invention, a computer system to perform high-speed functional testing of integrated circuits includes a processor, a memory coupled to the processor, and an error detection apparatus coupled to the memory. The error detection apparatus operates to protect the memory by periodically checking the validity of pre-validated data in the memory.

In accordance with an embodiment the present invention, a multi-processor computer system for performing high-speed functional testing includes a first processor, a second processor, a memory coupled to the first and second processors, and an error detection apparatus coupled to the memory. The error detection apparatus operates to protect the memory by periodically checking the validity of the pre-validated data in the memory.

In accordance with an embodiment the present invention, a multi-processor computer system for performing high-speed functional testing includes a first processor, a second processor, a first memory coupled to the first processor, a second memory coupled to the second processor, a first error detection apparatus coupled to the first memory and a second error detection apparatus coupled to the second memory. The error detection apparatus operates to protect the memory by periodically checking the validity of pre-validated data in the memory.

In accordance with an embodiment the present invention, an apparatus to detect errors in information stored in a processor resource includes an error detection component, the error detection component being configured to control the detection of errors in the information stored in the processor resource; and a comparison component coupled to the error detection component, the comparison component being configured to receive the information from the processor resource, to determine if the information is valid, and to output a signal to indicate an error condition if the information is invalid.

It should, of course, be understood that while the present invention has been described mainly in terms of single- and multi-processor-based personal computer systems, those skilled in the art will recognize that the principles of the invention may be used advantageously with alternative embodiments involving other integrated processor chips, memory structures, processor resources, operating systems and computer systems. Accordingly, all such implementations which fall within the spirit and the broad scope of the appended claims will be embraced by the principles of the present invention.

What is claimed is:

1. An apparatus comprising:
    an error detection component to control the detection of errors in information stored in a processor resource between stores of new information in the processor resource; and
    a comparison component coupled to the error detection component, the comparison component to receive the information from the processor resource, to determine whether the information is valid, and to output a signal to indicate an error condition if the information is invalid, wherein the processor resource is selected from the group consisting of a cache, at least one translation lookaside buffer (TLB), at least one region identification (RID), at least one protection key register, at least one model specific register (MSR), a control register access bus (CRAB) including at least one MSR coupled to the CRAB, a CRAB coupled to at least one other CRAB, and a TLB coupled to a MSR which is coupled to a CRAB.

2. The apparatus of claim 1, wherein the error detection component, comprises:
    an error detection state machine (EDSM) to output a next-entry-to read-out signal and a parity bit signal.

3. The apparatus of claim 2, wherein the EDSM, comprises:
    a timer to periodically output a next-entry-to-read-out signal to the processor resource;
    a next pointer coupled to the timer, the next pointer to contain a pointer value, which specifies a specific piece of information to be read out from the processor resource;
    a move-to-processor-resource logic component coupled to the timer, the move-to-processor-resource logic component to prevent the next-entry-to-read-out signal from being sent by the timer, if information is being moved into the processor resource;
    a counter coupled to the move-to-processor-resource logic component, the counter to count the number of shifts needed to compute the parity bit; and
    a parity and valid bits register coupled to the counter, the parity and valid bits register being configured to store at least one valid bit and parity bit pair.

4. The apparatus of claim 1, wherein the comparison component, comprises:
    a shift register, the shift register to receive the processor resource information and to output a parity bit for the processor resource information;
    a first exclusive OR (XOR) gate coupled to the shift register, the first XOR gate to receive the parity bit and a feedback signal and to output an indication of the validity of the parity bit; and
    a second XOR gate coupled to the first XOR gate, the second XOR gate to receive the parity bit signal and the indication of the validity of the parity bit and to output a machine check abort (MCA) if the parity bit signal and the indication of the validity of the parity bit indicate the processor resource information is invalid.

5. The apparatus of claim 4 further comprising
    a result latch coupled between the first XOR gate and the second XOR gate, the result latch to receive the indication of the validity of the parity bit from the first XOR gate, and to output a polarized signal, which indicates the validity of the parity bit.

6. The apparatus of claim 5, wherein the first XOR gate is to receive the polarized signal as the feedback signal.

7. The apparatus of claim 5, wherein the result latch is further to transmit the polarized signal to the error detection component.

8. The apparatus of claim 1, wherein the CRAB further comprises a checksum component coupled to the CRAB.

9. The apparatus of claim 1, wherein the CRAB further comprises:
    at least one MSR coupled to the CRAB; and
    a checksum component coupled to the CRAB.

10. A method comprising:
    controlling detection of errors in information stored in a processor resource, said controlling detection of errors including
        requesting information from the processor resource by periodically outputting a next-entry-to-read-out signal to the processor resource, when information is not being moved into the processor resource;
        computing a parity bit value for the information;
        outputting the computed parity bit value to a comparison component;
        comparing the computed parity bit value with an existing parity bit value associated with the information; and
    outputting a signal to indicate an error condition, if the computed parity bit value is not equal to the existing parity bit value.

11. The method of claim 10, farther comprising:
    counting the number of shifts needed to compute the parity bit value.

12. The method of claim 10, wherein outputting a next-entry-to-read out signal comprises:
    receiving a periodic read authorization signal;
    determining if the processor resource is in use; and
    outputting a next-pointer value indicating which item of information is to be read out, if the processor is not in use.

13. The method of claim 10, wherein computing the parity bit value, comprises:
    receiving the information;
    shifting-out the individual bits comprising the information; and
    computing a parity bit value for the information.

14. The method of claim 10, wherein outputting a signal to indicate an error condition, comprises:
    outputting a machine check abort (MCA) signal.

15. An article of manufacture comprising a machine-readable storage medium having stored thereon a plurality of executable instructions to perform a method comprising:
    controlling detection of errors in information stored in a processor resource, said controlling detection of information including
        requesting information from the processor resource by periodically outputting a next-entry-to-read-out signal to the processor resource, when information is not being moved into the processor resource;
        computing a parity bit value for the information;
        outputting the computed parity bit value to a comparison component;
        comparing the computed parity bit value with an existing parity bit value associated with the information; and
        outputting a signal to indicate an error condition, if the computed parity bit value is not equal to the existing parity bit value.

16. The article of manufacture of claim 15, wherein the method further comprises:

counting the number of shifts needed to compute the parity bit value.

17. The article of manufacture of claim 15, wherein outputting a next-entry-to-read out signal comprises:
   receiving a periodic read authorization signal;
   determining if the processor resource is in use; and
   outputting a next-pointer value indicating which item of information is to be read out, if the processor is not in use.

18. The article of manufacture of claim 15, wherein computing a parity bit value, comprises:
   receiving the information;
   shifting-out the individual bits comprising the information; and
   computing a parity bit value for the information.

19. The article of manufacture of claim 15, wherein outputting a signal to indicate an error condition, comprises:
   outputting a machine check abort (MCA) signal.

* * * * *

UNITED STATES PATENT AND TRADEMARK OFFICE
CERTIFICATE OF CORRECTION

PATENT NO. : 7,383,468 B2
APPLICATION NO. : 10/634899
DATED : June 3, 2008
INVENTOR(S) : Nhon T. Quach et al.

It is certified that error appears in the above-identified patent and that said Letters Patent is hereby corrected as shown below:

Column 8, Line 27 Claim 11 "farther comprising" should be --further comprising--

Column 8, Lines 30-31 Claim 12 "next-entry-to-read out signal" should be --next-entry-to-read-out signal--

Column 9, Line 4 Claim 17 "next-entry-to-read out signal" should be --next-entry-to-read-out signal--

Signed and Sealed this

Third Day of November, 2009

David J. Kappos
*Director of the United States Patent and Trademark Office*